United States Patent [19]

Sato

[11] Patent Number: 4,805,742

[45] Date of Patent: Feb. 21, 1989

[54] CALIPER BRAKE

[76] Inventor: Masataro Sato, 191-banchi, Ooaza Ikenobe, Miki-cho, Kita-gun, Kanagawa, Japan

[21] Appl. No.: 46,369

[22] Filed: May 6, 1987

[30] Foreign Application Priority Data

Feb. 2, 1987 [JP] Japan .................................. 62-22242

[51] Int. Cl.⁴ ............................ B62L 1/00; B62L 3/00
[52] U.S. Cl. ................................ 188/24.11; 188/24.12; 188/24.19
[58] Field of Search ............... 188/24.11, 24.12, 24.13, 188/24.14, 24.15, 24.16, 24.19, 24.21, 24.22, 72.9; 74/526

[56] References Cited

U.S. PATENT DOCUMENTS 4,305,482 12/1981 Arai ................................... 188/24.19

FOREIGN PATENT DOCUMENTS 7907021 9/1979 Netherlands ..................... 188/24.11
496827 12/1938 United Kingdom ............. 188/24.12
2145484 3/1985 United Kingdom ............. 188/24.12

Primary Examiner—Andres Kashnikow
Assistant Examiner—Mark T. Le
Attorney, Agent, or Firm—Armstrong, Nikaido Marmelstein & Kubovcik

[57] ABSTRACT

In a caliper brake having a pair of operating members which straddle a vehicle wheel and which come into slide contact at their pad portions with side surfaces of the wheel and further having a support shaft which pivotably supports the operating members, a restriction portion is provided on the support shaft so as to extend in the axial direction at a position deviated from the axis of the shaft, this restriction portion being inserted through holes formed in the operating members thereby in cooperation restricting the ranges of pivotal motion of the members and equalizing the maximum distances between the pads and wheel.

4 Claims, 5 Drawing Sheets

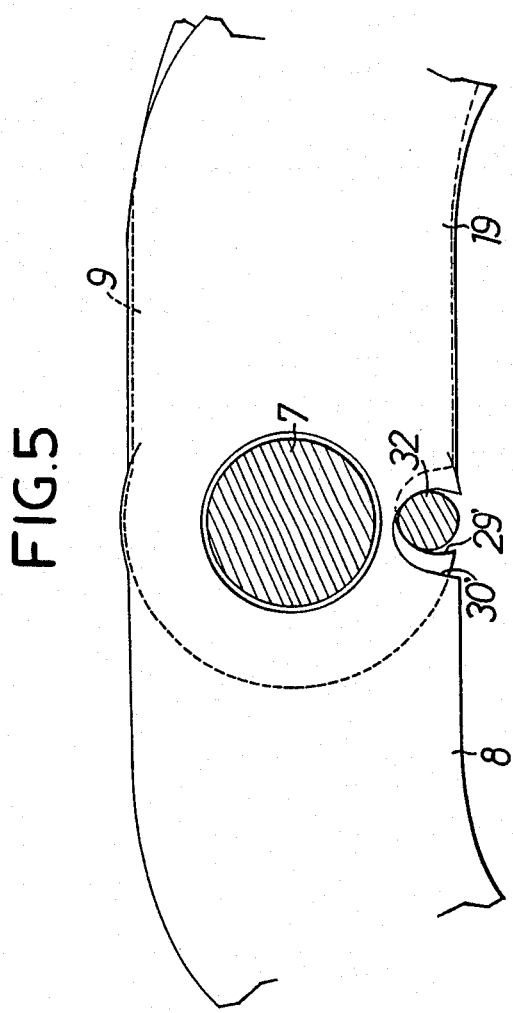

CALIPER BRAKE

BACKGROUND OF THE INVENTION

1. Field of the Invention

This invention relates to a caliper brake, including an operating member having a pad capable of slidingly contacting one side surface of a wheel and another operating member having a pad capable of slidingly contacting the other side surface of the wheel, these members being pivotably supported on a stationary support shaft so as to straddle the wheel while being urged by a spring in the direction in which their pads are moved away from the wheel, one operating member being connected to an end portion of an outer cable, the other operating member being connected to an end portion of an inner cable which projects from the outer cable.

2. Description of the Prior Art

In a conventional caliper brake of this kind, the ranges of pivotal movements of two operating members are not restricted, and the distance between two pads is determined generally on the basis of the distance between the end portions of the outer and inner cables (refer to, for example, Japanese Patent Laid-open No. 257381/1986).

However, the distance between the two pads in this conventional caliper brake is comparatively large before the caliper brake is installed on, for example, a bicycle. Therefore, the distances between the pads and a wheel are also comparatively large when the caliper brake is installed on the wheel, so that it is difficult to set the pads close to the wheel while maintaining the distances between the pads and wheel at an equal level. Consequently, the distances between the pads and wheel may sometimes become unequal when the caliper brake has been installed in place. This would cause a braking by only one side pad to occur when the brake is applied.

SUMMARY OF THE INVENTION

An object of the present invention which has been developed in view of these facts is to provide a caliper brake capable of adjusting the positions of pads easily so that the pads can come into slide contact with a wheel at an equal stroke.

According to the present invention, a support shaft is provided with a restriction portion extending in an axial direction of the shaft but deviated from the axis thereof, the restriction portion being inserted through restriction holes made in two operating members so as to restrict the ranges of pivotal movements of the operating members, the restriction holes being formed so that the maximum distances between the pads and wheel are at the same predetermined level.

Owing to this construction, the maximum distances between the wheel and the pads can be set at the same level in accordance with the width of the wheel, and such equalized distances between the pads and wheel can be achieved by only a slight adjustment, whereby the occurrence of braking by only one side pad can be prevented.

The above and other objects as well as advantageous features of the invention will become apparent from the following description of the preferred embodiments taken in conjunction with the accompanying drawings.

BRIEF DESCRIPTION OF THE DRAWINGS

FIGS. 1–3 show one embodiment of the present invention, wherein:

FIG. 1 is a front elevation of the embodiment set on a bicycle;

FIG. 2 is an exploded perspective view of the caliper brake; and

FIG. 3 is a sectioned front elevation of a principal portion of the embodiment.

FIGS. 4 and 5 illustrate another embodiment of the present invention, wherein:

FIG. 4 is an exploded perspective view corresponding to FIG. 2; and

FIG. 5 is a sectioned front elevation of a principal portion of the embodiment, which corresponds to FIG. 3.

DESCRIPTION OF THE PREFERRED EMBODIMENTS

The embodiments of the present invention will now be described with reference to the drawings. First, referring to FIG. 1 which illustrates an embodiment of the present invention, a caliper brake is set on a base portion 1a of a front fork 1, on which a front wheel W of a bicycle is supported, so as to straddle the front wheel W. This caliper brake B is adapted to be operated in accordance with the operation of a brake lever L pivotably provided on one end portion of a steering handle 2.

Figure 1:
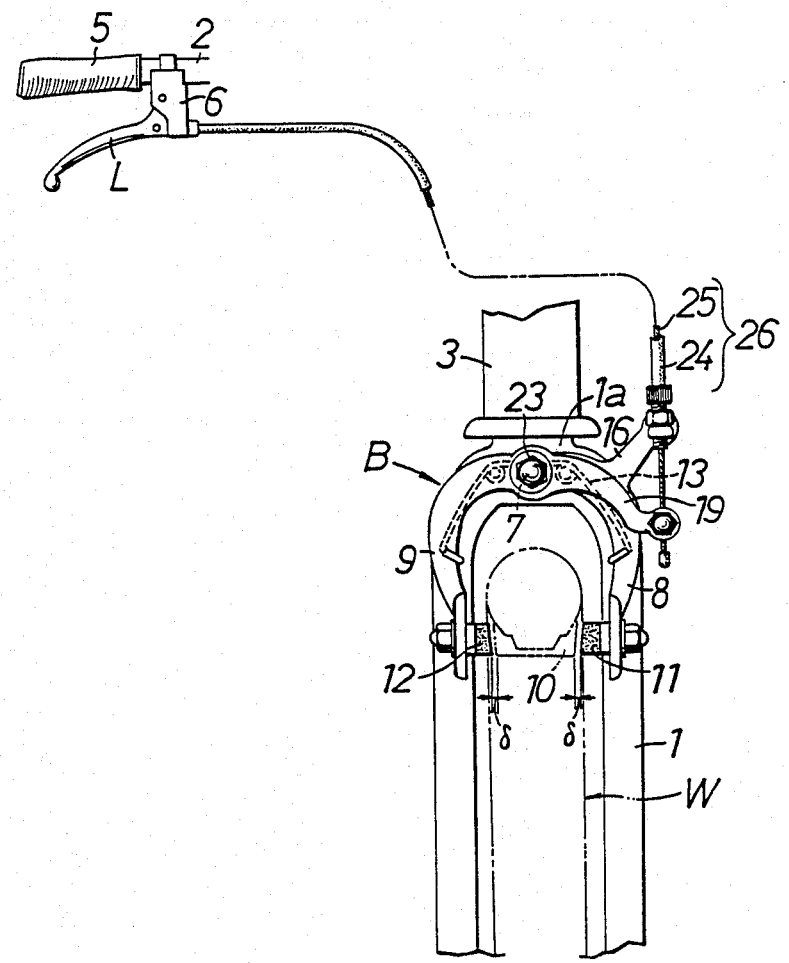
Figure 2:
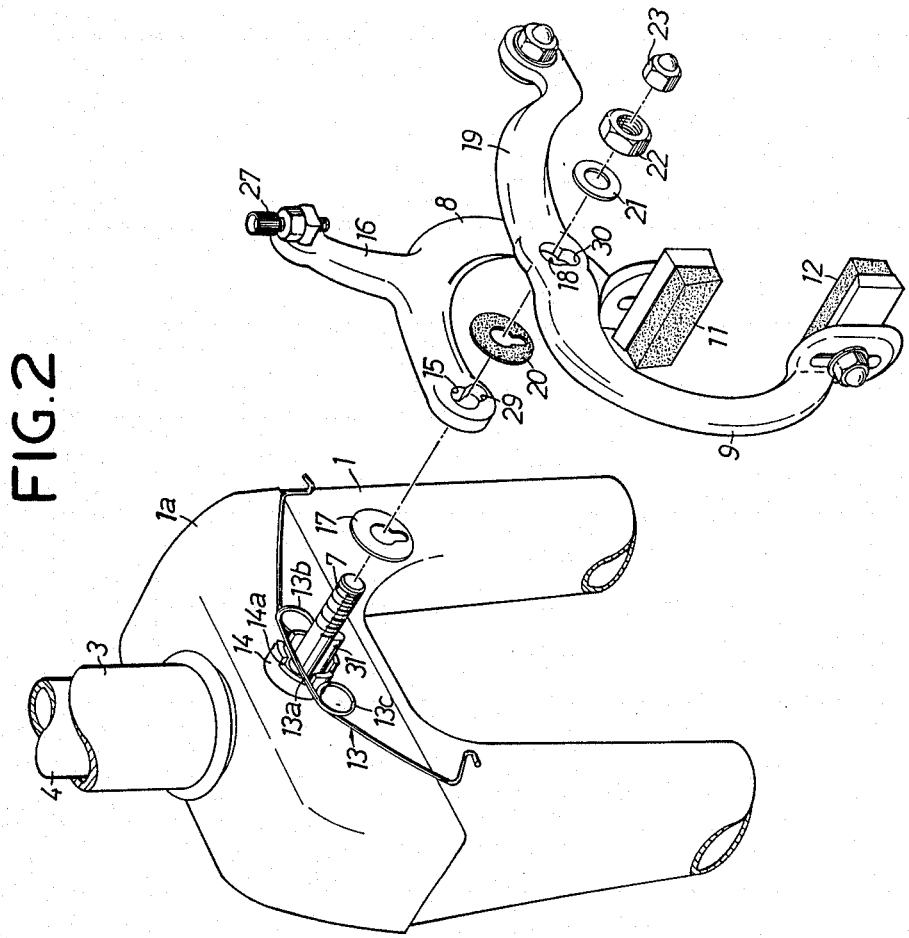

Referring to FIG. 2 in addition to FIG. 1, a handle post 4 is turnably supported in a head pipe 3 at the front portion of a body frame of the bicycle. The base portion 1a of the front fork 1 is joined to the lower end of this handle post 4, and the steering handle 2 is joined to the upper end thereof. A grip 5 is provided at one end of the steering handle 2, and the brake lever L is supported by a support member 6 fixed to the steering handle 2 at the position close to the grip 5 so that the lever L can be turned away from and toward the grip 5.

The caliper brake B comprises a support shaft 7 fixed to the base portion 1a of the front fork 1, a pair of operating members 8, 9 pivotably supported on the support shaft 7 so as to straddle the front wheel W, rubber pads 11, 12 fixed to the operating members 8, 9, respectively, and adapted to slidingly contact a rim 10 of the front wheel W, and a spring 13 urging the operating members 8, 9 in directions in which the pads 11, 12 are moved away from the side surfaces of the rim 10.

A large-diameter portion 14 which contacts the front surface of the base portion 1a of the front fork 1 is formed integrally with the support shaft 7 at its intermediate portion. The support shaft 7 is inserted through the base portion 1a until its large-diameter portion 14 comes into contact with the front surface of the base portion 1a. The support shaft 7 is fixed to the base portion 1a by screwing a nut (not shown) to the rear end of the shaft 7 projecting from the rear surface of the base portion 1a.

One operating member 8 is formed arcuately, provided at its base end portion with a support hole 15 through which the support shaft 7 is inserted, and at its free end portion with the pad 11 such that the position of the pad 11 can be vertically adjusted. The operating member 8 is also provided with a connecting arm 16 formed integrally therewith to extend from the outer surface of an intermediate portion of the operating member 8 in the outward direction. This operating member 8 is supported on the support shaft 7 with a washer 17 interposed between the operating member 8 and large-diameter portion 14.

The other operating member 9 is formed so that it extends arcuately to the opposite side of the above-mentioned operating member 8. The operating member 9 is provided at its base end portion with a support hole 18 through which the support shaft 7 is inserted, and at its free end portion with pad 12 such that the position of the pad 12 can be vertically adjusted. The operating member 9 is further provided with a connecting arm 19 formed integrally therewith so that the free end of the connecting arm 19 is positioned below the connecting arm 16 of the operating member 8. The operating member 9 is supported on the support shaft 7 with a washer 20 of a synthetic resin interposed between the operating members 9, 8 so that these operating members 9, 8 can be turned smoothly with respect to each other.

A nut 22 and a cap nut 23 are engaged with the end portion of the support shaft 7 projecting from the operating member 9, via a washer 21 interposed between the operating member 9 and nut 22. Accordingly, the two operating members 8, 9 are supported on the support shaft 7 so that the operating members 8, 9 can be turned relatively to each other between the large-diameter portion 14 and nut 22.

The spring 13 is a torsion spring having twisted portions 13b, 13c at both sides of an intermediate support portion 13a. The support portion 13a is engaged with a notch 14a formed in the large-diameter portion 14 of the support shaft 7, and the free end sections of the two twisted portions 13b, 13c are engaged with the two operating members 8, 9. Owing to this construction, these operating members 8, 9 are urged in the direction in which the pads 11, 12 are turned away from the rim 10 of the front wheel W.

The brake lever L and caliper brake B are operatively connected via a brake cable 26 which comprises an outer cable 24 and an inner cable 25 movably inserted in the outer cable 24.

One end of the outer cable 24 is connected to the support member 6, and one end, which projects from the same end of the outer cable 24, of the inner cable 25 to the brake lever L. An adjuster 27 is screwed to a free end portion of the connecting arm 16 of the operating member 8 in a manner that the adjuster 27 can be axially moved. The other end of the outer cable 24 is fitted in the adjuster 27. The other end, which projects from this end of the outer cable 24, of the inner cable 25 is inserted through the adjuster 27 and joined to the free end of the connecting arm 19 of the operating member 9. Accordingly, when the brake lever L is operated, the inner cable 25 is drawn, so that the connecting arm 16 is pressed down together with pulled-up motion of the connecting arm 19, as known in this kind of brake cable. Consequently, the operating members 8, 9 are turned in the direction in which the pads 11, 12 come into sliding contact with the rim 10, so that a braking force is obtained.

The base portion of the operating member 8 is provided with a restriction hole 29 formed continuous with the lower portion of the support hole 15, while the base portion of the operating member 9 is provided with a restriction hole 30 continuous with the lower portion of the support hole 18. The support shaft 7 is integrally provided with a restriction portion 31 extending in the axial direction of the shaft 7 but deviated from its axis and inserted through the restriction holes 29, 30. Namely, the restriction portion 31 projecting and extending axially from the outer surface of the support shaft 7 is formed integrally with the support shaft 7.

Figure 3:
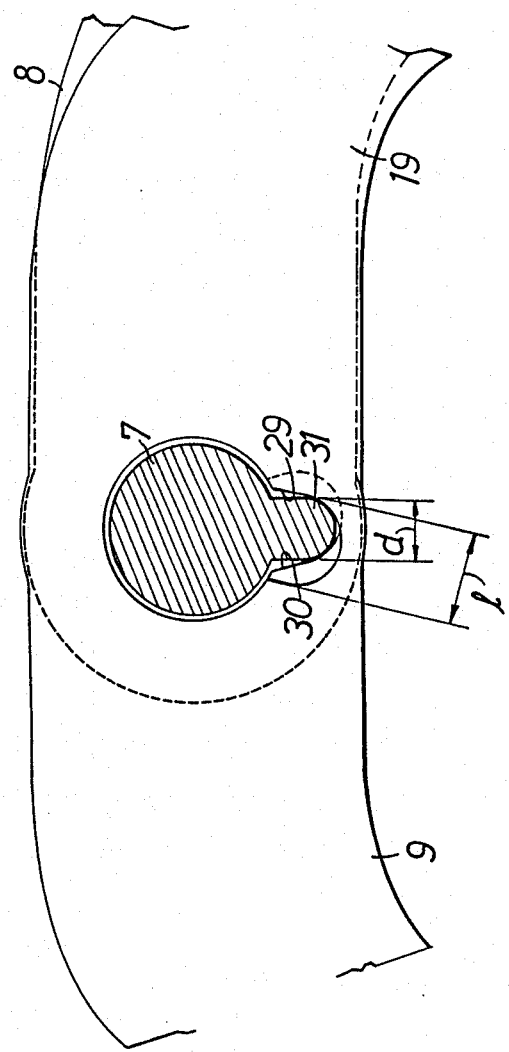

Referring to FIG. 3 in addition to FIGS. 1 and 2, each of the restriction holes 29, 30 is formed so that the length 1 thereof in the circumferential direction of the support shaft 7 is larger than the circumferential width d of the restriction portion 31. Namely, the restriction holes 29, 30 are formed so that, when no additional external force is applied to the operating members 8, 9 which are urged by the spring 13, i.e., when the restriction portion 31 contacts one circumferential wall of the restriction hole 29 and the opposite circumferential wall of the restriction hole 30 the distances δ between the pads 11, 12 and the side faces of the rim 10 are equal to each other. This means that a maximum level of the distance δ between each of the pads 11, 12 and rim 10 is limited by the restriction holes 29, 30 and restriction portion 31 which are abutted against each other.

The operation of this embodiment will now be described. Due to the restriction portion 31 inserted through the restriction holes 29, 30, the maximum range of pivotal movements of the operating members 8, 9 by the force of the spring 13 is determined. Therefore, if the positions of the restriction holes 29, 30 are selected suitably, the maximum distance between the pads 11, 12 can be set correspondingly to the width of the associated wheel W. This maximum distance is set slightly larger than the width of the rim 10 of the wheel W.

When the caliper brake B set in this manner is installed on a bicycle, the distances δ between each of the pads 11, 12 and the opposed each side surface of the rim 10 are made comparatively small. Accordingly, it is easy to set the distances δ between the pads 11, 12 and rim 10 equal. Installation of the caliper brake B is completed by merely reducing and adjusting the distance between the free ends of the connecting arms 16, 19 to a small extent. Owing to this arrangement, the distances δ between each of the pads 11, 12 and rim 10 become equal to each other at the time of completion of a brake-setting operation. When the brake is operated, the pads 11, 12 slidingly contact the rim 10 under an equal pressure, so that a reliable braking force can be obtained. This enables the braking only by one side pad to be prevented reliably.

Figure 4:
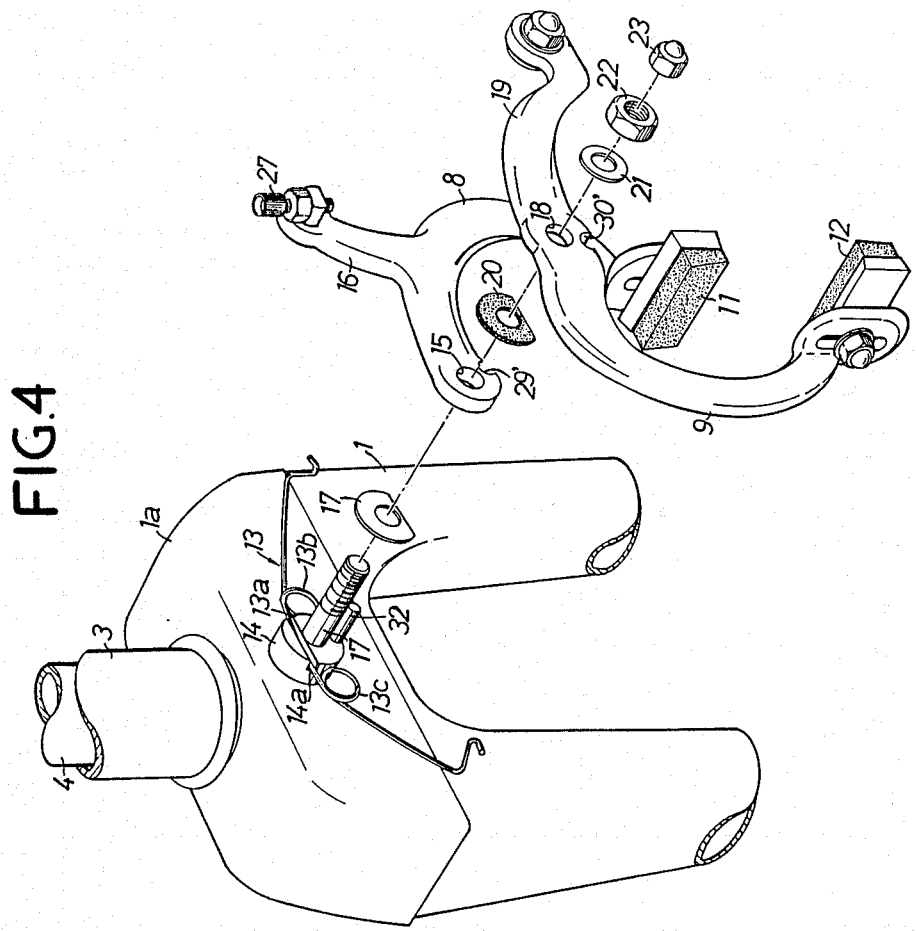

FIGS. 4 and 5 show another embodiment of the present invention, in which the parts corresponding to those of the previously-described embodiment are designated by the same reference numerals.

Two operating members 8, 9 are provided with restriction recesses 29', 30', which are independent of support holes 15, 18, and which are each opened, for example, at one side surface thereof. A large-diameter portion 14 of a support shaft 7 is projectingly provided with a restriction pin 32 as a restriction portion extending in the axial direction of the shaft 7 but radially deviated from the axis of the shaft 7, this restriction pin 32 being inserted through the two restriction recesses 29', 30'.

This embodiment is also capable of providing the same effect as the previously-described embodiment.

The restriction portion and restriction holes may be positioned at any area of the support shaft 7 along its circumference.

According to the present invention described above, the support shaft is provided with a restriction portion extending in an axial direction of the shaft but radially deviated from the axis of the shaft, and the restriction portion is inserted through the restriction holes perforated in a pair of operating members so as to restrict the ranges of pivotal movements of the operating members. The two restriction holes are constructed so as to make the maximum distances between the pads and the wheel equal of a predetermined level. Accordingly, the distances between the wheel and pads can be set to a predetermined comparatively low level when the caliper brake is installed on the wheel, and the work of installation of the caliper brake can be completed by merely moving the operating members slightly. This enables the distances between the pads and wheel to be kept equal, assuring a reliable braking force. Therefore, the braking by only one side pad can be prevented.

The present invention is not, of course, limited to the above embodiments; it may be modified in various ways within the scope of the appended claim.

What is claimed is:

1. A caliper brake comprising a first operating member provided with a pad adapted to come into slide contact with one of opposite side surfaces of a vehicle wheel, a second operating member provided with a pad adapted to come into slide contact with the other side surface of the wheel, and a stationary support shaft having an axis and pivotably supporting said first and second operating members such that the operating members straddle the wheel and have their pads resiliently biased in directions away from the wheel, one of the operating members being connected with an end of an outer cable while the other operating member being connected with an end of an inner cable projected from said outer cable, further comprising means for restricting ranges of pivotal movements of both the members relative to said support shaft, said means including a restriction portion formed on said support shaft extending in an axial direction of the shaft at a position deviated from the axis of the shaft, said restriction portion being inserted through restriction holes formed in the operating members, said holes serving to make equal maximum distances between the respective pads and the wheel.

2. A caliper brake as set forth in claim 1, wherein said first and second operating members are bored with support holes, respectively, through which the support shaft penetrate, said restriction holes being formed continuously with the support holes.

3. A caliper brake as set forth in claim 1, wherein said first and second operating members are bored with support holes, respectively, through which the support shaft penetrate, said restriction holes being formed independently from the support holes and having one sides open, respectively.

4. A caliper brake disposed on a body of a vehicle and operable by an actuating means on the body via a cable extending therebetween so as to apply a braking force to a wheel mounted on the body, said caliper brake comprising a pair of operating members provided with pads, respectively, and straddling the wheel, and a stationary support shaft fixed to the vehicle body for supporting said pair of operating members pivotally around the shaft, said pads on the operating members being normally urged by a biasing means away from opposite side surfaces of the wheel and coming into slide contact with the surfaces through operation of the actuating means, wherein means is provided to limit the retraction of both of the operating members with respect to the vehicle wheel, said means comprising restriction holes bored in the respective operating members and a restriction portion integral with the vehicle body and penetrating through the restriction holes, said restriction holes and restriction portion being so formed to abut against each other in a brake-release state.

* * * * *

UNITED STATES PATENT AND TRADEMARK OFFICE
CERTIFICATE OF CORRECTION

PATENT NO.   : 4,805,742
DATED        : February 21, 1989
INVENTOR(S)  : Masataro SATO It is certified that error appears in the above-identified patent and that said Letters Patent is hereby corrected as shown below:

On the cover page, Item [76] line 3 "Kanagawa" should read --Kagawa-ken--.

Signed and Sealed this

Third Day of October, 1989

Attest:

DONALD J. QUIGG

*Attesting Officer*          *Commissioner of Patents and Trademarks*